(12) United States Patent
Xu (10) Patent No.: US 12,125,233 B2
(45) Date of Patent: Oct. 22, 2024

(54) ASSOCIATING DEVICE COORDINATE SYSTEMS IN A MULTI-PERSON AUGMENTED REALITY SYSTEM

(71) Applicant: GUANGDONG OPPO MOBILE TELECOMMUNICATIONS CORP., LTD., Guangdong (CN)

(72) Inventor: Yi Xu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 142 days.

(21) Appl. No.: 17/723,227

(22) Filed: Apr. 18, 2022

(65) Prior Publication Data

US 2022/0245851 A1 Aug. 4, 2022

Related U.S. Application Data

(63) Continuation of application No. PCT/CN2020/130874, filed on Nov. 23, 2020.
(Continued)

(51) Int. Cl.
*G06T 7/70* (2017.01)
*G06T 7/00* (2017.01)
*G06T 19/00* (2011.01)

(52) U.S. Cl.
CPC .......... *G06T 7/70* (2017.01); *G06T 7/97* (2017.01); *G06T 19/006* (2013.01); *G06T 2207/30204* (2013.01)

(58) Field of Classification Search
None
See application file for complete search history.

(56) References Cited

U.S. PATENT DOCUMENTS 9,558,557 B2   1/2017 Jiang et al.
11,127,193 B2 * 9/2021 Segal .................. G06T 15/10
(Continued)

FOREIGN PATENT DOCUMENTS

CN   106340056 A   1/2017
CN   110276794 A   9/2019
(Continued)

OTHER PUBLICATIONS

Artoolkit, GitHub, https://github.com/artoolkit, 1 page; Jan. 15, 2020.
(Continued)

*Primary Examiner* — Tapas Mazumder
(74) *Attorney, Agent, or Firm* — Young Basile Hanlon & MacFarlane, P.C.

(57) ABSTRACT

Methods and systems are disclosed for mapping the coordinate systems of devices for AR applications. A third device may receive a first pose from a first device associated with a first coordinate system and a second pose from a second device associated with a second coordinate system. The third device may receive an image that includes fiducial markers presented by each of the first device and the second device. The first pose and the portion of the image including the first fiducial marker may define a first set of 3D coordinates. The second pose and the portion of the image including the second fiducial marker may define a second set of 3D coordinates. A coordinate-system transform can be generated from a correspondence between the first set and the second of 3D coordinates. The coordinate-system transform may be transmitted to the first device and/or the second device.

20 Claims, 5 Drawing Sheets

Related U.S. Application Data (60) Provisional application No. 62/941,130, filed on Nov. 27, 2019.

(56) References Cited

U.S. PATENT DOCUMENTS

| | | | | |
|---|---|---|---|---|
| 2010/0331041 | A1* | 12/2010 | Liao | G06V 10/462 |
| | | | | 455/556.1 |
| 2019/0356849 | A1* | 11/2019 | Sapienza | G06V 20/10 |

FOREIGN PATENT DOCUMENTS

| | | | |
|---|---|---|---|
| CN | 110310325 | A | 10/2019 |
| KR | 20190080641 | A | 7/2019 |
| WO | 2011118282 | A1 | 9/2011 |
| WO | 2019012314 | A1 | 1/2019 |
| WO | 2019215738 | A1 | 11/2019 |

OTHER PUBLICATIONS

Cloud Anchors quickstart for Android, ARCore, Google Developers, https://console.cloud.google.com/apis/library/arcorecloudanchor.googleapis.com, 11 pages; Apr. 4, 2022.

Creating a Multiuser AR Experience, https://developer.apple.com/documentation/arkit/creating_a_multiuser_ar_experience, 5 pages; Apr. 2022.

Wagner et al., "Towards Massively Multi-User Augmented Reality on Handheld Devices", Graz University of Technology, In Proceedings of the Third international conference on Pervasive Computing (Pervasive '05), 12 pages; 2005.

G. Reitmayr and D. Schmalstieg, "Mobile collaborative augmented reality," Proceedings IEEE and ACM International Symposium on Augmented Reality, New York, NY, USA, 2001, pp. 114-123.

Artoolkit, GitHub, https://github.com/artoolkit, 1 page.

Cloud Anchors quickstart for Android, ARCore, Google Developers, https://console.cloud.google.com/apis/library/arcorecloudanchor.googleapis.com, 11 pages.

Eggert et al., "Estimating 3-D rigid body transformations: a comparison of four major algorithms", Machine Vision and Applications, vol. 9, pp. 272-290, 1997.

Creating a Multiuser AR Experience, https://developer.apple.com/documentation/arkit/creating_a_multiuser_ar_experience, 5 pages.

International search report issued with English Translation in corresponding PCT/CN2020/130874 dated Feb. 8, 2021.

First Office Action with English translation issued in corresponding CN Application No. 202080078551.3, dated Jul. 17, 2024, 14 pages.

* cited by examiner

ASSOCIATING DEVICE COORDINATE SYSTEMS IN A MULTI-PERSON AUGMENTED REALITY SYSTEM

CROSS-REFERENCE TO RELATED APPLICATION(S)

This application is a continuation of International Application No. PCT/CN2020/130874, filed Nov. 23, 2020, which claims priority to U.S. Provisional Patent Application No. 62/941,130, field Nov. 27, 2019, the entire disclosures of which are hereby incorporated by reference.

TECHNICAL FIELD

The present disclosure relates generally to augmented reality (AR), and more specifically, and without limitation, to associating coordinate systems of multiple devices in an AR environment.

BACKGROUND

AR presentations can project virtual objects within a virtual environment displayed on a display of a device and corresponding to a real-world environment in which the device is located. A camera of the device can capture the real-world environment. A virtual object may be created to mimic a real-world object and presented on the display of the device such that the virtual object appears as if it was naturally positioned within the virtual environment. For instance, the camera may capture live video of a real-world environment that includes empty picnic table. The device may generate a virtual object of a picnic basket and the virtual object is presented as if it was positioned on the picnic table. The virtual object is presented on the display in substantially the same manner as the corresponding real-world object would have appeared if the real-world object was physically located on the picnic table.

In multi-device AR systems, each device may present a virtual environment representing the real world-environment. In particular, each device presents the virtual environment from that device's perspective. Thus, it can be important in such systems that the virtual environment is consistently presented across the devices.

SUMMARY

Aspects of the present disclosure include a method for mapping coordinate systems of devices in a multi-person AR application. The method comprises: receiving, by a third mobile device, data indicating a first pose of a first mobile device, wherein the first pose is defined relative to a first coordinate system associated with the first mobile device; receiving, by the third mobile device, data indicating a second pose of a second mobile device, wherein the second pose is defined relative to a second coordinate system associated with the second mobile device; receiving, by the third mobile device, an image that shows a first fiducial marker displayed by the first mobile device and a second fiducial displayed by the second mobile device; identifying, by the third mobile device, a first set of three-dimensional coordinates associated with the first fiducial marker, the first set of three-dimensional coordinates being identified relative to the first coordinate system; identifying, by the third mobile device, a second set of three-dimensional coordinates associated with the second fiducial marker, the second set of three-dimensional coordinates being identified relative to the second coordinate system; generating, by the third mobile device based on the first set of three-dimensional coordinates and the second set of three-dimensional coordinates, a coordinate-system transform that maps coordinates between the first coordinate system and the second coordinate system; and transmitting, by the third mobile device, the coordinate-system transform to the second mobile device.

Another aspect of the present disclosure includes a mobile device comprising one or more processors, a camera, and a non-transitory computer-readable media that includes instructions that when executed by the one or more processors, cause the one or more processors to perform the method described above.

Another aspect of the present disclosure includes a non-transitory computer-readable media that includes instructions that when executed by one or more processors, cause the one or more processors to perform the method described above.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF DRAWINGS

The present disclosure is described in conjunction with the appended figures:

FIG. 5 illustrates examples of components of a computing system that executes an AR application according to at least one aspect of the disclosure In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Augmented-reality applications execute on devices to present virtual objects within contemporaneously captured video of a real-world environment within which the devices are located. A device may present the captured video on a display of the device with a virtual object presented therein such that the virtual object appears properly in the virtual environment. For instance, the virtual object may be presented on the display in substantially the same position and orientation as how a corresponding real-world object would appear if the real-world object was physically positioned in the real-world environment. In order to maintain the coherence of the virtual object as the device moves, the device may track its position and orientation within the real-world environment to ensure the virtual object continues to appear properly despite changes in the device's perspective. The position and orientation define a pose of the device. The device may define a coordinate system to map the virtual environment to the real-world environment and track both its pose and the virtual object.

In multi-device augmented-reality applications, the same virtual object can be presented on each display of multiple devices located in a real-world environment. Typically, each device executes a tracking process, such a SLAM process, to track its pose (e.g., position and orientation) within the environment according to its own coordinate system. Since the coordinate systems of the devices differ, transformation between the coordinate systems may be needed in order to display instances of the same virtual object on the devices in a coordinated and coherent manner. The transformation can be generated based on one or more of the devices displaying known fiducial markers and remaining devices capturing images of these fiducial markers. In particular, at least two devices present fiducial markers and a third device generates an image that shows the presented fiducial markers to derive a transformation between coordinate systems of the two devices.

In an example, during an AR calibration, a first device and a second device may begin tracking their respective poses (e.g., positions and orientations) within the real-world environment. The first device may determine a first pose ($T_1$) relative to a first coordinate system of the first device using, for example, a SLAM process or other tracking technique. Similarly, the second device may determine a second pose ($T_2$) relative to a second coordinate system of the second device. The first device may present a first fiducial marker on a display of the first device and transmit data about the first pose ($T_1$) to a third device. The second device may also present a second fiducial marker on a display of the second device and transmit data about the second pose ($T_2$) device to the third device. The third device may be directed to generate an image that shows the fiducial markers displayed by the first device and the second device within a same image.

In some examples, instances of the same fiducial marker can be presented by the first device and the second device. Based on the image, an AR application of the third device detects first feature points $p_{1i}$ (i=0, 1, 2, 3 . . . n) from the first fiducial marker and detects second feature points $p_{2i}$ (i=0, 1, 2, 3 . . . n) from the second fiducial marker. The second feature points $p_{2i}$ (i=0, 1, 2, 3 . . . n) have one-to-one correspondence with the first feature points $p_{1i}$ (i=0, 1, 2, 3 . . . n). The AR application derives a first set of three-dimensional (3D) coordinates of the first feature points $p_{1i}$ (i=0, 1, 2, 3 . . . n) in the first coordinate system from the first pose ($T_1$) of the first device and known information about the geometry of the first device. Further, the AR application derives a second set of 3D coordinates of the second feature points $p_{2i}$ (i=0, 1, 2, 3 . . . n) in the second coordinate system from the second pose ($T_2$) and information about the geometry of the second device. The AR application establishes a correspondence between the first set of 3D coordinates and the second set of 3D coordinates.

The third device uses the correspondence to generate a coordinate-system transform. The coordinate-system transform can map points (e.g., coordinates) of the first coordinate system into corresponding points within the second coordinate system and vice versa. In some instances, the coordinate-system transform may include an estimation of one or more rigid transformations such as rotations, translations, reflections, combinations thereof, or the like.

The devices described herein may be any type of computing device such as, for example only, mobile devices (e.g., smartphones, laptops, tablets, PDA's, or the like), desktop computing devices, specialized hardware devices such as stationary or portable gaming consoles, or the like. The devices described herein may include a built-in camera that may be utilized during execution of an AR application. In some instances, the camera may not be built-in, but instead connected to the device. In those instances, the device and camera may move independent of each other. The coordinate system of the device may be based on the position/orientation of the device or based on the position/orientation of the camera.

Figure 1:
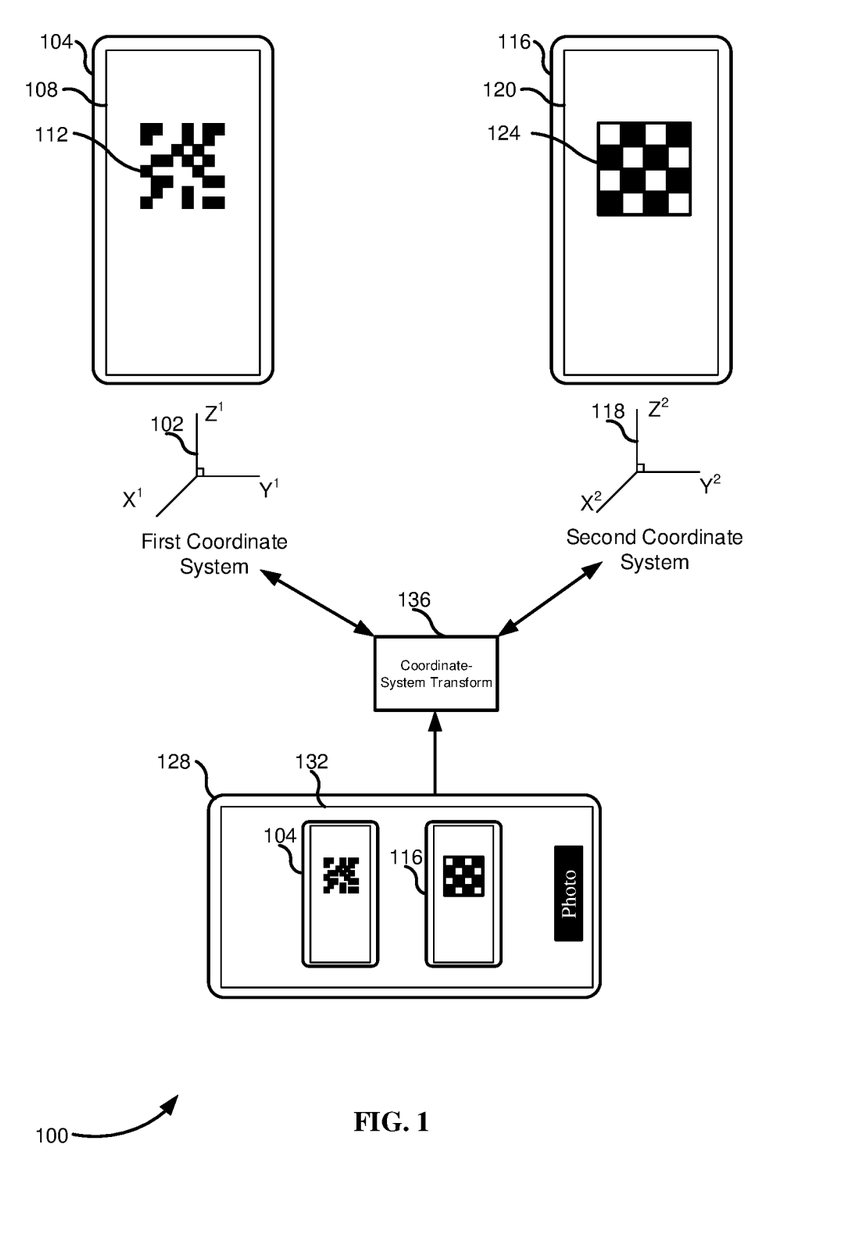
FIG. 1 is an illustration of an AR system in which the coordinate systems of multiple device can be aligned according to at least one aspect of the disclosure.

FIG. 1 is an illustration of an AR system 100 in which the coordinate systems of multiple device can be mapped according to at least one aspect of the disclosure. AR system 100 may operate a multi-device augmented-realty application in which virtual objects may be presented within a display of each device. For instance, first device 104 may define a virtual object to be presented within an environment within which the first device is located. The virtual object may be presented on display 108 of the first device 104 as if the virtual object was a physical object positioned within the environment. Since the position of the virtual object within the environment may be based on the coordinate system 102 of the first device, a coordinate system that may not be shared by a second device 116 of the multi-device AR application, the virtual object may not be properly presented on the display 120 of the second device 116 until the coordinate system of the first device 104 can be mapped to the coordinate system 118 of the second device 116.

During an initial calibration process of the AR application, the coordinate system 102 of the first device 104 can be mapped to the coordinate system 118 of the second device 116 without using a fixed reference point in the environment. For example, each of the first device 104 and the second device may present on a respective display, an image of a fiducial marker. A third device 128 may access an image of the first device 104 and the second device 116 displaying the fiducial markers and use the image (along with a pose of each of the first device and the second device and device geometry information of each device) to generate a coordinate-system transforms that map coordinates of the first coordinate system 102 associated with the first device into corresponding coordinates of a second coordinate system 118 associated with the second device.

In particular, during the calibration, it can be determined that a device's current position is at the origin of its own coordinate system. The device may track its own movement using internal sensors (e.g., accelerometers, global positioning system (GPS) sensors, compass, combinations thereof, or the like), image processing (e.g., using machine-learning, deep learning, or the like), or a combination thereof and update its position within its coordinate system. The device may not data associated with the environment within which it is positioned, but it may track its position relative to where the device was initially calibrated (e.g., its origin). For instance, if the internal sensor indicate that the device has moved a meter after the calibration, the position of the device may be determined as being a meter (in a particular direction) from the origin. Thus, the device's coordinate system may be used to indicate a relative location of the device (e.g., relative to the location of the device at the calibration time), but not necessarily the absolute location of the device since the environment may be unknown.

In some instances, a device may execute a simultaneous localizations and mapping (SLAM) process that may define the coordinate system of the device and a pose of the device. The SLAM process may also track the device and the objects within the environment relative to the coordinate system of the device. SLAM processes may be used to track the device and objects within the environment even when the environment is unknown (at least initially) to the SLAM process. SLAM processes may take as input variables such as, but are not limited to, control data ct, sensor data st, and time intervals t and generate an output that may include an approximate location of the device xt for at a given time interval and a map of the environment mt.

SLAM may initiate with a calibration step in which an empty map of the environment may be initialized with the device positioned at the origin. As the device captures sensor data that indicates movement in a particular direction (and optionally image data from a camera of the device that may be used to indicate objects within the environment), the SLAM process may update xt and mt. SLAM may be an iterative process that updates xt and mt in set time intervals or when new sensor data or image data can be detected. For instance, if no sensor change occurs between time interval t and t+1, then the SLAM process may delay updating the position and map to preserve processing resources. Upon detecting a change in sensor data indicating a high probability that the device has moved from its previous position xt, the SLAM process may compute the new position of device xt and update the map mt.

Once the initial pose of the first device and the second device are detected by the first device and the second device respectively, the first device may present a fiducial marker 112 on display 108 of the first device 104 and the second device may present a fiducial marker 124 on display 120 of the second device 116. Fiducial markers 112 and 124 may be predetermined such that the size, shape, color, pattern, shading, etc. may be known to the devices of multi-device AR system 100. The fiducial markers 112 and 124 may be the same or different. If the fiducial markers 112 and 124 are to be a same fiducial marker, the first device may transmit an identification of the fiducial marker to be displayed to the second device to cause the second device to display the same fiducial marker. Alternatively, the second device may transmit an identification of the fiducial marker to be displayed to the first device to cause the first device to display the same fiducial marker.

If the fiducial markers 112 and 124 displayed on the first device and the second device are different, then the third device may identify the fiducial marker displayed by each device (e.g., using imaging processing as described below) or by receiving an identification of the fiducial marker displayed from the first device and the second device. The third device may then determine the feature points of one fiducial marker correspond to the feature points of the other fiducial marker (e.g., correspond to the same 2D coordinates or same physical position on the first device, etc.). For instance, the third device may use a table that includes a correspondence between feature points of two or more fiducial markers. The third device may use the identification of each fiducial marker and identify from the table the corresponding feature points of each fiducial marker. Fiducial marker 112 and fiducial marker 124 are shown as different fiducial markers in which fiducial marker 112 may include a set of black squares distributed across a predefined area, the predefined area has known dimensions. Fiducial marker 124 may be a checkerboard pattern of black and white squares.

The third device 128 may be directed to obtain an image of display 108 of the first device 104 and display 120 of the second device 116 while fiducial markers 112 and 124 are presented such that both fiducial markers 112 and 124 may appear in the image. Since the size, color, pattern, etc. of the fiducial marker are known, the image of the fiducial markers 112 and 124 can be processed to define a first set of two-dimensional feature points corresponding to fiducial marker 112 and second set of two-dimensional feature points corresponding to fiducial marker 124. Feature points may correspond to a point within a fiducial marker such as the center of a square, a vertex between squares, a corner of the fiducial marker, or any other point of the fiducial marker that can be readily identified based on a characteristic of the fiducial marker. The first set of two-dimensional feature points may be processed along with the first pose of the first device 104 and the known geometry information of the first device to identify a first set of 3D coordinates (relative to the first coordinate system 102) where each 3D coordinate may correspond to a feature point of the first set of feature points. The second set of two-dimensional feature points may be processed along with the second pose of the second device 116 and the known geometry information of the second device to identify a second set of 3D coordinates (relative to the second coordinate system 118) where each 3D coordinate may correspond to a feature point of the second set of feature points. A correspondence between the first set of 3D coordinates and the second set of 3D coordinates can be used to generate a coordinate-system transform that includes one or more rigid transformations. Rigid transformations are geometric transformations of Euclidean space that preserve the distances between pairs of points. A rigid transformation can include rotations (about one or more axes), translations, reflections, or combinations thereof. The rigid transforms may provide a mapping of the coordinates of the first coordinate system 102 to corresponding coordinates of the second coordinate system 118.

Mapping the first coordinate system 102 to the second coordinate system 118 may be performed during the initial calibration process. In some instance, the mapping process may be performed again after the initial calibration process such as when the SLAM process resets (as this will initiate a new coordinate system for that device), after a calibration value indicates that the mapping is no long accurate, or upon a predetermined time interval lapsing.

Figure 2:
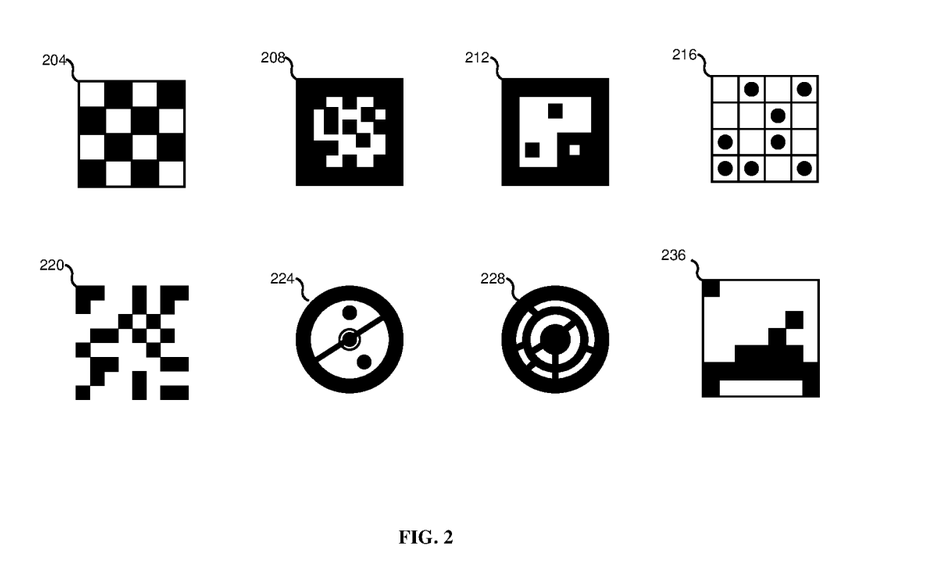
FIG. 2 illustrates examples of fiducial markers that may be presented on a first device for multi-device coordinate system alignment according to at least one aspect of the disclosure.

FIG. 2 illustrates examples of fiducial markers that may be presented on devices to map the coordinate systems of each device according to at least one aspect of the disclosure. Fiducial markers 204-236 may be fiducial markers that may be used to map coordinate systems of devices. When placed in the real-world, fiducial marker may be used detect a location, orientation, and/or scale of objects within an environment. Fiducial markers 204-236 may include a predefined size, shape, and pattern that can be known to a device that captures an image of the fiducial marker. Using the known characteristics of the fiducial marker, the device can detect the fiducial marker within the image and compute the location of the fiducial marker, define a virtual object to occupy a space near or at the fiducial marker, detect the scale of objects within the environment, detect the orientation of the device relative to the fiducial marker, combinations thereof, or the like.

For instance, characteristics of each fiducial marker may be selected to enable detection of the fiducial marker and its feature points regardless of the particular rotation or transformation of the maker within the captured image. For instance, a fiducial marker may include one or more shapes within the fiducial marker that appear differently when rotated or transformed so as to indicate a degree of rotation and/or transformation upon detection. The degree of rotation/transformation may be used to determine the orientation of the device that captured the image. For instance, if the fiducial marker in the image is rotated 45 degrees, then it can be determined that the device is also rotated by 45 degrees.

In some instances, one or more rotations, affine transformations, Euclidean transformations, reflections, transpositions, combinations thereof may be performed on the image of the fiducial marker and output a processed fiducial marker that appears in a predetermined orientation. For instance, the device capturing the fiducial marker may store characteristics of the fiducial marker (e.g., size, pattern, colors, etc.). Yet, the fiducial marker may not appear as expected (e.g., rotated, blurry, stretched, etc.). The image may be processed to isolate the fiducial marker and rotate and/or transform the fiducial marker such that fiducial marker appears in an expected orientation. In other instances, the image of the fiducial marker may not be processed to change the orientation of the fiducial marker within the image.

Devices detect the orientation of the fiducial marker by detecting one or more feature points of the fiducial marker. Feature points may be detected using the detected characteristics of the fiducial marker and the known characteristics of the fiducial marker. For instance, feature points may be based on particular characteristics of the maker. For instance, fiducial marker 204 can be a checkerboard pattern. Feature points may be detected at the vertices between each set of four squares, at the center of each white square or black square, at the corners, at the corners of each white square, at the corners of each black square, combinations thereof, or the like. Each fiducial marker may include one or more feature points that can be detected within an image. In some instance, each fiducial marker may include three or more feature points. While any number of feature points may be detected, the more feature points that can be detected the greater the accuracy in mapping one coordinate system to another coordinate systems.

In some instances, each fiducial marker may include a different number of feature points from other fiducial markers. For instance, a first fiducial marker may include a first set of feature points and a second fiducial marker may include a second set of feature points (where the number of feature points in the first set does not equal the number of feature points in the second set). At least some of the feature points in the first set of feature points can correspond to at least some of the feature points in the second set of feature points. These corresponding feature points can be identified through the table that the correspondence between different fiducial markers. For example, the table may indicate which feature points of the first set of feature points of the first fiducial marker correspond to which feature points of the second set of feature points of the second fiducial marker. In these instances, the first set of feature points can include three or more feature points that correspond to feature points in the second set of feature points.

Devices may use image processing to detect the fiducial marker from other portions of the image as well as to detect feature points from the fiducial marker. One such image processing technique includes edge detection. Edge detection may include a filtering technique in which one or more filters can be applied to the image. Filters may modify the image by, blurring, sharpening, transforming (such as, but not limited to one or more affine transformations, Euclidian transformations, or the like), and/or the like. Filters may reduce image noise by, for example, removing image artifacts and/or other portions of the image that does not correspond to the fiducial marker.

In some instances, an image may have some portions that may be processed more than other portions of the image. For instance, a portion of the image to appear blurry and another portion of the image may be clear. Different filters may be applied to different portions of the image, and in addition, a different set of filters may be applied to different portions of the image. For example, a first portion of the image may be filtered to sharpen the first portion and a second portion of the image may be filtered with an affine transformation filter and noise reduction. Any number of different filters may be applied to the image and/or each patch.

Once the filters are applied, edge detection may identify variations in pixel intensity gradients across adjacent pixels. Large variations in the intensity between adjacent pixels can be indicative of the presence of an edge. For example, a first pixel with a high intensity value next to pixels with low intensity values can provide an indication that the first pixel is part of an edge. In some instances, pixels that are not part of edges may be suppressed (e.g., set to a predetermined red/green/blue value, such as black, where red=0, blue=0, and green=0, or any predetermined red/green/blue value). An edge detection operator such a Roberts cross operator, a Prewitt operator, a Sobel operator, and/or the like may be used as part of the identification of the pixel intensity gradients.

A non-maximum suppression process may be used to suppress pixels that do not correspond strongly to an edge. The non-maximum suppression process assigns an edge strength value to each pixel identified using the pixel intensity gradient as being part of an edge. For each pixel identified as being part of an edge, the pixel's edge strength value can be compared to the edge strength value of the pixel's s eight surrounding pixels. If the pixel has a higher edge strength value than the edge strength value of the surrounding pixels (e.g., local maxima), then the surrounding pixels are suppressed. Non-maximum suppression may be repeated for each pixel in the entire image.

A double threshold process may then be executed to remove noise and/or spurious edge pixels that carried through application of previous image processing techniques applied herein. Two thresholds of pixel intensities may be defined, one high and one low. The thresholds may be used to assign an intensity property to each pixel as being strong or weak. Pixels that include an intensity value higher than the high threshold can be assigned a strong intensity property, where pixels that include an intensity value that is between the high threshold and the low threshold can be assigned a weak intensity property. Pixels that include an intensity value below the low threshold may be suppressed (e.g., in the same manner as described above).

A hysteresis process may then be executed to remove pixels with a weak intensity property (that is weak due to noise, color variation, etc.). For example, a local statistical analysis (e.g., a connected-component analysis, etc.) may be performed for each pixel with a weak intensity property. Pixels with a weak intensity property that are not surrounded by a pixel that includes a strong intensity property may be suppressed. The remaining pixels (e.g., the un-suppressed pixels) after the hysteresis process include only those pixels that are part of edges. Although the above five processing processes were described in a particular order, each process may be executed any number of times (e.g., repeated), and/or executed in any order without departing from the spirit or the scope of the present disclosure. In some instances, only a subset of the five processes need be performed on the image. For example, image processing may perform identification of the pixel intensity gradients process without first performing a filtering process. In some instances, images may be received partially processed (e.g., one or more of the processes above having already been performed). In those instances, one or more additional processes may be performed to complete the image processing.

In some instances, signal processing may be performed on the image (e.g., similar to a radio frequency signal). The image may be transformed into a frequency domain (e.g., using a Fourier transform or the like) to represent the frequency in which a particular pixel characteristic exists in the image (e.g., pixel intensities, RGB values, and/or the like). In the frequency domain, one or more filters (such as, but not limited to, Butterworth filters, band pass, and/or the like) may be applied to the image (e.g., during preprocessing, edge detection, or after) to suppress or alter particular frequencies. Suppressing particular frequencies can reduce noise, eliminate image artifacts, suppress non-edge pixels, eliminate pixels of particular colors or color gradients, normalize color gradients, and/or the like. A high-pass filter may reveal edges in an image (e.g., sharp contrasts of color and/or intensity between adjacent pixels) while a low-pass filer may blend edges (e.g., blur). Image padding may be performed prior to signal processing to improve the signal processing techniques. In some instances, different portions and/or patches of the image may be processed differently with some being processed with a high-pass filter and others with a low-pass filter. In some instances, the thresholds (e.g., the cutoff frequency for the high or low-pass filters) may be modified for different portions of the image (e.g., based on image processing one or more previous images, machine-learning, and/or the like).

Signal processing may also determine other properties of the image such as coherence (e.g., used in edge detection, segmentation, pattern analysis, etc.), which identifies the relation between pixels. The relation between pixels can be used to further refine edge detection and/or to identify the structural properties of what is depicted within the image. For example, coherence can be used to identify portions of the image that are related (e.g., portions of a same object) from parts of the image that are not.

Fiducial markers 204-236 are examples of fiducial markers that can be used to map one coordinate system to another coordinate system of two or more devices. For instance, fiducial marker 204 may be a checkerboard pattern with alternating squares of two or more colors. In some instances, the colors may have a high degree of contrast such as white and black. In other instance, one or more colors other than black and white may be used such as red, green, and/or blue (or alternatively cyan, magenta, and/or yellow). In still yet other instances, contrasting pattern fill may be used in which one set of squares may not include a pattern, and another set of squares may use cross-hatching. Fiducial marker 204 may or may not include a border that surrounds the fiducial marker as edge detection may be used to define the borders of the fiducial marker.

Fiducial markers can have irregular shapes and may not conform to set patterns. For instance, fiducial markers 208, 212, 216, 220, and 236 include a set of black squares dispersed a predefined area. The square shape of the fiducial marker may be used, in part, to determine the particular contours of the fiducial marker. In addition, the dispersal pattern of the set of squares (e.g., the distance between two or more particular squares, etc.), may be used to indicate the position of the device that captured the image. For instance, the distance between two non-adjacent squares may be known to the device. The device may calculate the difference between the known distance and the distance detected in a captured image. The larger the difference between the known value and the distance calculated from the image, the further away the camera may be from the fiducial marker.

Similarly, the size of particular sets of squares may be calculated and compared to known sizes. Variations in sizes of the squares can be used to determine the orientation of the device relative to the fiducial marker. For instances, one side of squares is larger than the squares of the other sides, the camera of the device may have captured the image of the fiducial marker from an angle offset and not perpendicular from the fiducial marker.

In some instances, a fiducial marker may have a non-square shape such as fiducial markers 224 and 228. Fiducial markers 224 and 228 may have a circular shape with internal circular shapes. In some instances, one or more additional shapes may be included within those fiducial markers such as the lines that bisect the circles. These additional shapes may indicate an orientation of the fiducial marker so as to indicate the orientation of the device.

Although particular shapes are shown in FIG. 2 having a particular pattern, shape, color, orientation, and/or the like fiducial markers may have any particular shape that may be geometric such the squares and circles shown, or amorphous.

Figure 3A:
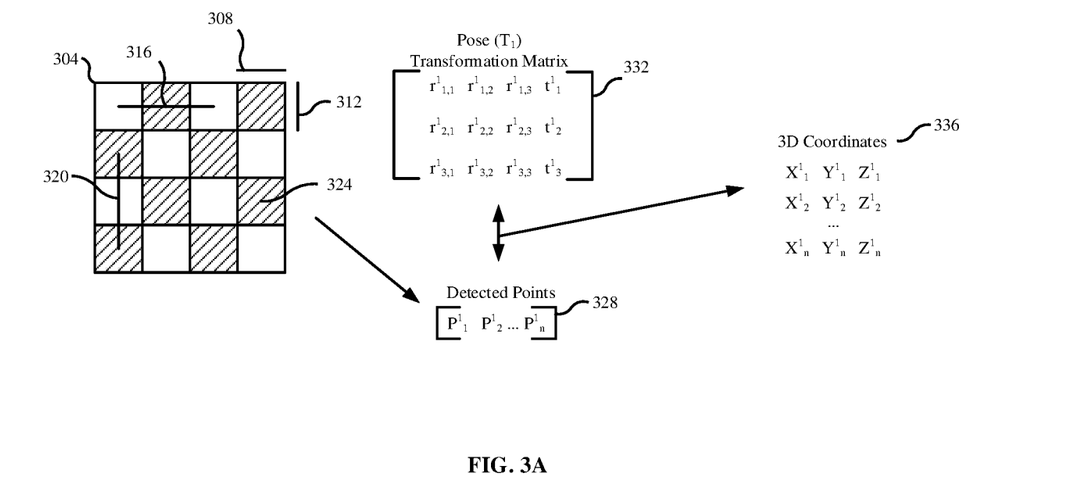
FIG. 3A illustrates a process for generating a pose of a device relative to a coordinate system of another device according to at least one aspect of the disclosure.

FIG. 3A illustrates a process for generating 3D coordinates of a first device relative to a coordinate system of the first device according to at least one aspect of the disclosure. A third device may capture an image of a first device and of a second device that are both presenting a fiducial marker. The first device may be presenting fiducial marker such as fiducial marker 304. The third device may detect one or more feature points of fiducial marker 304. Feature points can be any visually distinctive aspect of a fiducial marker. In some instances, an orientation of the camera may be determined from the orientation of the fiducial marker based on characteristics of the fiducial marker. For instance, fiducial marker 304 may be oriented based on a color of the corner shapes or the distances between non-adjacent shapes such has 316, 320. The feature points may be detected based on particular characteristics of the fiducial marker such the size of individual components of the fiducial marker (e.g., 308 and 312), color, shape, pattern, combinations thereof, or the like. For instance, fiducial marker 304 may include feature points at each vertex 324 formed by two adjacent shapes that share a common color. In that instance, fiducial marker 304 may include 9 feature points. Other fiducial markers may include more or less feature points. In some instances, any fiducial marker that includes at least three feature points may be used as fiducial marker 304. The feature points may be aggregated into a first set of feature points 328.

A pose ($T_1$) 332 of the first device at the instant in which the image of maker was captured by the third device may be received from the first device. A pose may represent a position and an orientation of the first device relative to the coordinate system of the first device. In some instances, pose 332 may be represented by a rotation vector $R^1_n$ a translation vector $t^1_n$. The rotation vector and translation vector can be represented within a transformation matrix as shown. Pose ($T_1$) may be determined using a SLAM process executing on the first device, image processing of images captured by the first device, device geometry information such as the dimensions of the device, camera information (e.g., scaled focal lengths, skew parameter, principle point, scale factors, or the like), internal sensors (e.g., accelerometers, gyroscopes, compasses, or the like), combinations thereof, or the like.

The pose ($T_1$) of the first device and the information about the geometry of the first device may be used to identify 3D coordinates 336 of each feature point of the first set of feature points relative to the coordinate system of the first device. For instance, since the pose of the first device may indicate the 3D coordinates of the first device in the first coordinate system, the device geometry can be used to determine the 3D coordinates of each feature point of the first set of set feature points point in the first coordinate system.

Figure 3B:
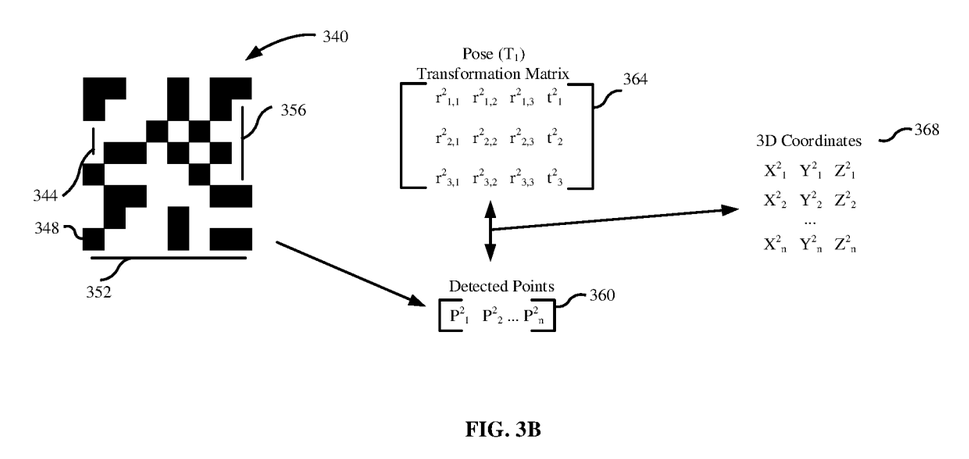
FIG. 3B illustrates a process for generating 3D coordinates of a second device relative to a coordinate system of the second device according to at least one aspect of the disclosure.

FIG. 3B illustrates a process for generating 3D coordinates of a second device relative to a coordinate system of the second device according to at least one aspect of the disclosure. The second device may display the same fiducial marker as the first device or a different fiducial marker such as, but not limited to, fiducial marker 340. Fiducial marker 340 may include a set of black shapes distributed within a predefined area. The shapes may be distributed such that an ordination of the fiducial marker can be used to determine an orientation of the camera that obtained the image of the fiducial marker. One or more feature points may be detected from fiducial marker 340 based on characteristics of fiducial marker 340 such as, but not limited to, the number of black shapes, the distance between particular black shapes such has 344 or 356, shapes having one or more common vertices or a particular number of common vertices, one or more corners of the fiducial marker such as 348, size of the fiducial marker such as 352, pattern of the fiducial marker, color, combinations thereof or the like. In some instances, any fiducial marker that includes at least three feature points may be used as a fiducial marker 340. The feature points may be aggregated into a second set of feature points 360.

A pose ($T_2$) 364 of the second device at the instant in which the image of the fiducial maker 340 was captured by the third device may be received. In some instances, pose 364 may be represented by a rotation vector $R^2_n$ a translation vector $t^2_n$. The rotation vector and translation vector can be represented within a transformation matrix as shown. Pose ($T_2$) may be determined in a similar manner as determined by the first device and as described. The pose ($T_2$) of the second device and information about the geometry of the second device may be used to identify data indicative of the 3D coordinates 368 of each feature point of the second set of feature points relative to the coordinate system of the second device. The data indicative of the 3D coordinates 368 may be identified in a similar manner as described above.

Figure 3C:
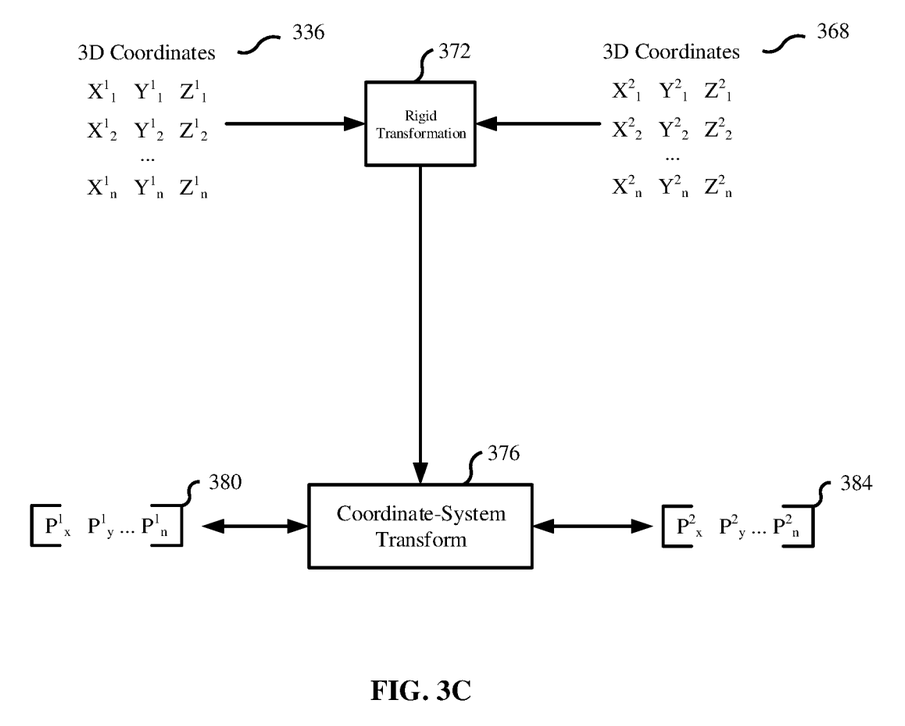
FIG. 3C illustrates a process for generating a coordinate-system transform according to at least one aspect of the disclosure.

FIG. 3C illustrates a process for generating a coordinate-system transform according to at least one aspect of the disclosure. The 3D coordinates 336 of the first set of feature points and the 3D coordinates 368 of the second set of feature points may be used to define one or more rigid transformations 372 that may change coordinates of the first coordinate system into coordinates of the second coordinate system. For instance, each feature point $n^1$ of the first feature points has a corresponding feature point $n^2$ of the second feature points. This correspondence can be used to match each 3D coordinate of the first coordinate system to a corresponding coordinate in the second coordinate system. For example, for each feature point, $n^1$, the corresponding 3D coordinate $[x^1_n, y^1_n, z^1_n]$ in the first coordinate system and the corresponding feature point $n^2$ of the second feature points can be identified. Then the 3D coordinate $[x^2_n, y^2_n, z^2_n]$ in the second coordinate system that is associated with feature point $n^2$ can be identified. A correspondence between 3D coordinate $[x^1_n, y^1_n, z^1_n]$ and 3D coordinate $[x^2_n, y^2_n, z^2_n]$ can then be made. One or more rigid transformations such as rotations, translations, reflections, or the like may be applied to 3D coordinate $[x^1_n, y^1_n, z^1_n]$ to change the 3D coordinate $[x^1_n, y^1_n, z^1_n]$ into the 3D coordinate $[x^2_n, y^2_n, z^2_n]$. Rigid transformations can include, one or more rotations, one or more translations, one or more reflections, one or more combinations thereof, and the like. In some instances, a second one or more rigid transformations 372 may be defined that may change coordinates of the second coordinate system into coordinates of the first coordinate system.

A coordinate-system transform 376 can be generated using the first one or more rigid transformations 372 or the one or more second rigid transforms depending on a selected coordinate system. For instance, the third device (or alternatively, the first device, the second device, a user of any of the devices, or a server), may select a reference coordinate system (e.g., the first coordinate system or the second coordinate system) in which the coordinates of virtual objects are to be based. Upon selection, the coordinate-system transform 376 can be generated that can convert coordinates of the non-selected coordinate system into the corresponding coordinates of the selected coordinate system. For instance, the coordinate-system transform may apply each of the one or more rigid transformations to identify from an input coordinate (e.g., 380) of the first coordinate system a corresponding output coordinate (e.g., 376) in the second coordinate system. In some instances, the coordinate-system transform may include both the first one or more rigid transformations and the second one or more rigid transformations such that the coordinate-system transform may convert coordinates in the first coordinate system into corresponding coordinates of the second coordinates system and convert coordinates in the second coordinate system into corresponding coordinates of the first coordinates system as needed.

Figure 4:
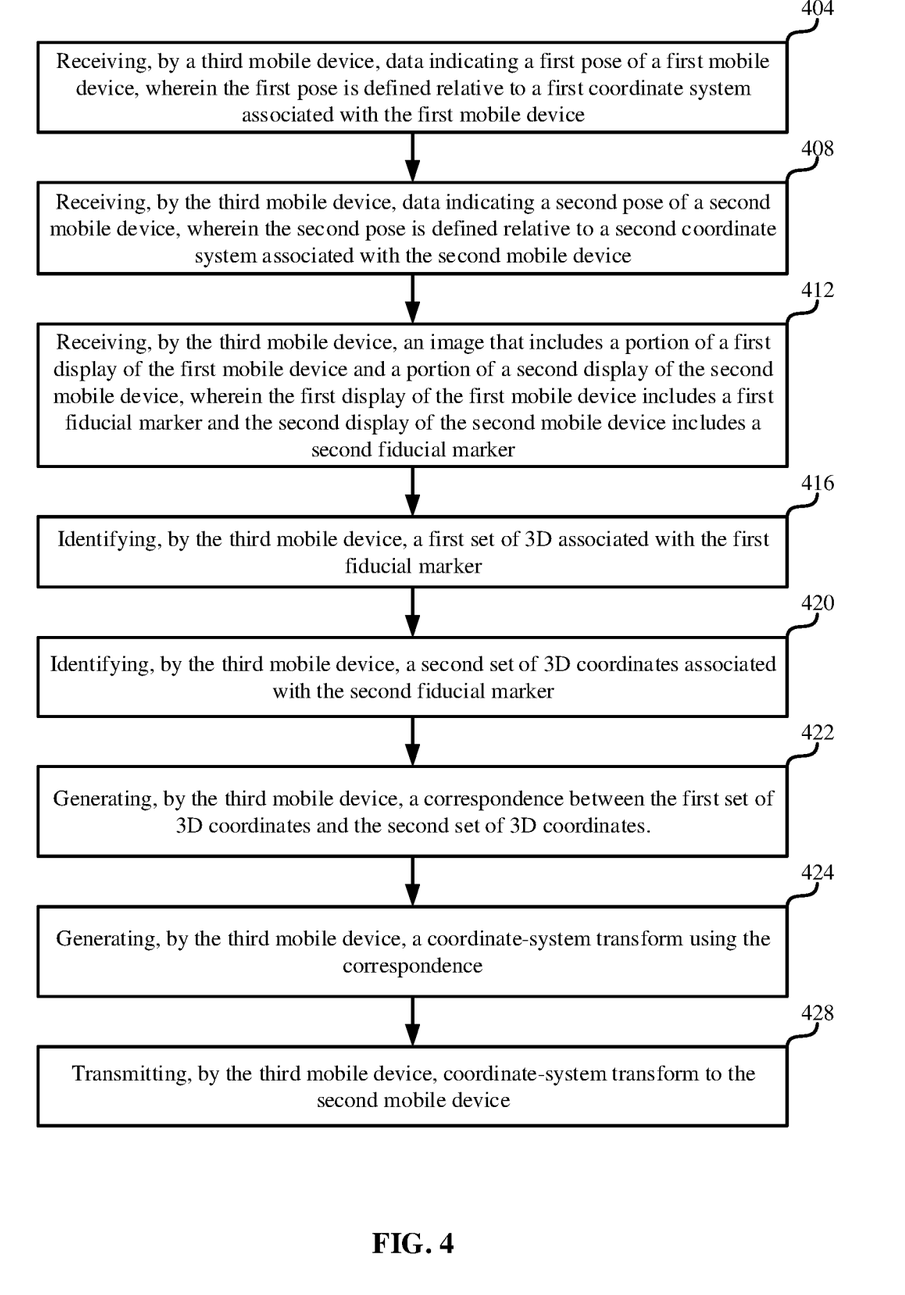
FIG. 4 is a flowchart of a process for aligning the coordinate systems of two mobile devices according to at least one aspect of the disclosure.

FIG. 4 is a flowchart of a process for mapping one coordinate system to another coordinate system according to at least one aspect of the disclosure. At block 404, a first pose ($T_1$) of a first mobile device may be received by a third mobile device. The first mobile device may execute a position tracking process, such as a SLAM process, that continuously tracks the pose ($T_1$) of the first mobile device as associated with the first coordinate system of the first mobile device. The first pose, ($T_1$) may be received at a particular instant in time such as at time in which an image of the first device is captured. The third mobile device may receive device geometry information associated with the first mobile device such as the device dimensions, display dimensions, and the like. For instance, the third mobile device may receive the device geometry information with the first pose, with an image of a fiducial marker displayed on the first mobile device such as the fiducial marker described below, from another device such as a server or the second mobile device, or the like. In some instances, the third mobile device may receive a model identifier of the first mobile device. The third mobile device may then execute a query (e.g., against internal storage tables or from a server) to obtain the device geometry information using the model identifier. The third mobile device may also receive an identifier of a first fiducial marker that indicates the particular fiducial marker displayed by the first mobile device.

At block 408, a second pose ($T_2$) of a second mobile device may be received by the third mobile device. Similar to the first device, the second mobile device may execute a position tracking process, such as a SLAM process, that continuously tracks the pose ($T_2$) of the second mobile device as associated with the second coordinate system of the second mobile device. The second pose, ($T_2$), may be received at a particular instant in time such as at time in which an image of the second device is captured. In some instances, the first pose and the second pose may be received at approximately the same time (e.g. concurrently). In other instances, the first pose and the second pose may be received asynchronously such as in series with one pose being received prior to the other pose being received. The third mobile device may receive device geometry information associated with the second mobile device such as the device dimensions, display dimensions, and the like. For instance, the third mobile device may receive the device geometry information with the second pose, with an image of a fiducial marker displayed on the second mobile device such as the fiducial marker described below, from another device such as a server or the second mobile device, or the like. In some instances, the third mobile device may receive a model identifier of the second mobile device. The third mobile device may then execute a query (e.g., against internal storage tables or from a server) to obtain the device geometry information using the model identifier. The third mobile device may also receive an identifier of a second fiducial marker that indicates the particular fiducial marker displayed by the second mobile device.

At block 412, an image of a first fiducial marker presented on a display of the first mobile device and a second fiducial marker presented on a display of the second mobile device may be received by the third mobile device. The third device may receive from each of the first device and the second device, data instructions to present to a user that direct the user to operate a camera of the third device to capture an image of the first fiducial marker and the second fiducial marker. For example, the third mobile device may use a camera to obtain a picture of the display of the first mobile device and the second mobile device while each device is presenting the first fiducial marker and the second fiducial marker. In another example, the image may be received by the third mobile device over a network.

A first set of feature points can be detected from the portion of the image including the first fiducial marker and a second set of feature points can be detected from the portion of the image including the second fiducial marker. Since fiducial markers have a known size and geometry, the feature points can be used to determine a position and/ orientation of the third device relative to the fiducial. In conjunction with the pose of the device presenting the fiducial, the set of feature points may be used to define 3D coordinates of set of feature points in a same coordinate system as the pose. In some instances, the set of feature points includes three feature points. In other instances, the set of feature points includes four or more feature points.

At block 416, a first set of 3D coordinates may be defined by the third device. The first set of 3D coordinates may be defined using the first pose of the first mobile device, device geometry information of the first mobile device, and the first set of feature points. For instance, the known size and geometry of the fiducial marker may be exploited by using the mobile device geometry to estimate a physical position of each feature point (e.g., associated with the first coordinate system) displayed by the first mobile device. The pose of the first mobile device can be used to determine a 3D coordinate of each feature point in the first coordinate system.

At block 420, a second set of 3D coordinates may be defined by the third device. The second set of 3D coordinates may be defined using the second pose of the second mobile device, device geometry information of the second mobile device, and the second set of feature points. For instance, the known size and geometry of the fiducial marker may be exploited by using the mobile device geometry to estimate a physical position of each feature point (e.g., associated with the second coordinate system) displayed by the second mobile device. The pose of the second mobile device can be used to determine a 3D coordinate of each feature point in the second coordinate system. In some instances, the first set of 3D coordinates may be defined concurrently with the second set of 3D coordinates. In other instances, the first set of 3D coordinates may be defined asynchronously (e.g., such as overlapping or in series with one set of coordinates being defined before the other set of coordinates) with the second set of 3D coordinates.

At block 422, a correspondence between the first set of 3D coordinates and the second set of the second set of 3D coordinates can be generated. If the same fiducial image is displayed on both the first mobile device and the second mobile device, then each feature point of the first feature points will correspond to a feature point of the second feature points forming pairs of corresponding feature points. A correspondence between 3D coordinates can be generated by matching the 3D coordinates of the first set of 3D coordinates and the second set of 3D coordinates that are associated with a pair of feature points. If different fiducial images are displayed, then each of the first mobile device and the second mobile device may send an identification of the fiducial marker displayed to the third mobile device. The third mobile device may use a lookup table to determine a correspondence between the first feature points and the second feature points, forming pairs of corresponding feature points. The correspondence between 3D coordinates can then be generated by matching the 3D coordinates of the first set of 3D coordinates and the second set of 3D coordinates that are associated with a pair of feature points. The correspondence may represent a mapping that links coordinates of the first set of 3D coordinates (associated with the first coordinate system) and coordinates of the second set of 3D coordinates (associated with the second coordinate system).

At block 424, a coordinate-system transform may be generated using the first set of 3D coordinates and the second set of 3D coordinates. For instance, since each feature point in the first feature points has a corresponding feature point in the second feature points, the 3D coordinate associated with the feature point in the first feature points can be matched to a 3D coordinate that is associated with the corresponding feature point in the second feature points. Each 3D coordinate associated with the first device may be matched to a 3D coordinate of the second device. Once matched, one or more rigid transformations can be applied to a first 3D coordinate of the first coordinate system to change the first 3D coordinate into its matched 3D coordinate in the second coordinate system.

In some instances, a single matching pair of 3D coordinates may be used to define the rigid transformation needed to map coordinates in one coordinate system to corresponding 3D coordinates in the another coordinate system. The remaining pairs of 3D coordinates may be used to verify the accuracy of the one or more rigid transformations. In other instances, two or more matching pairs of 3D coordinates may be used to define the rigid transformation needed to map coordinates in one coordinate system to corresponding 3D coordinates in the another coordinate system. In still yet other instance, each matching pair of 3D coordinates may be used to define the rigid transformation needed to map coordinates in one coordinate system to corresponding 3D coordinates in the another coordinate system.

The coordinate-system transform may include one or more rigid transforms that apply one or more of rotations, translations, or reflections to coordinates of the first coordinate system to identify corresponding coordinates of the second coordinate system. In some instances, the coordinate-system transform may additionally (or alternatively) include one or more rigid transforms that apply one or more of rotations, translations, or reflections to coordinates of the second coordinate system to identify corresponding coordinates of the first coordinate system.

The coordinate-system transform may map points in the first coordinate system of the first mobile device into corresponding points in the second coordinate system of the second mobile device. In some instances, positions computed by the SLAM process of the first mobile device may be transformed into corresponding positions in the second coordinate system of the second mobile device. In other instances, positions computed by the SLAM process of the second mobile device may be transformed into corresponding positions in the first coordinate system of the first mobile device.

At block 428, the coordinate-system transform may be transmitted to the second mobile device to enable the second mobile device to convert coordinates received in the first coordinate system to be converted into the second coordinate system. In some instances, the coordinate-system transform may be transmitted to the first mobile device to enable the first mobile device to convert coordinates received in the second coordinate system to be converted into the first coordinate system. In other instances, the coordinate-system transform may be transmitted to both the first mobile device and the second mobile device to enable coordinates to be converted into the appropriate coordinate system. This may enable a respective device to convert received coordinates into a native coordinate system of the respective mobile device and encode coordinates of the respective mobile device into a coordinate system of a receiving device prior to transmitting the encoded coordinates to the receiving device.

For example, in an AR application, the first mobile device may capture images or video of an environment. The first mobile device may define a first instance of a virtual object that is to be presented on a display of the first mobile device such that the first instance of the virtual image appears as if physically and naturally positioned within the environment. The SLAM process may track the first mobile device as it moves within the environment and the AR application may continue to present the first instance of the virtual object as if naturally positioned within the environment (regardless of the first mobile device's change in position or orientation).

The second mobile device may receive from the first mobile device (or from a server) information associated with the virtual object including characteristics that enable the second mobile device to render an instance of the virtual object on a display of the second mobile device and pose information that indicates a position and orientation of the virtual object within the environment. The second device may convert the coordinates of the pose information from the first coordinate system of the first mobile device to the coordinate system of the second mobile device using the coordinate-system transform. The second mobile device may capture images or video of an environment. The second mobile device may then present the second instance of the virtual object within the captured images/video of the environment such that the second instance of the virtual object appears as if physically (and naturally) located within the environment (regardless of the second mobile device's change in position or orientation).

The process of FIG. 4 may be executed entirely by the third mobile device; partially by one or more of the first mobile device, the second mobile device, the third mobile device and/or a server; entirely by the server. For instance, a server may direct the mapping of the coordinate systems of the first mobile device and the second mobile device and execute all or part of the augmented—reality application. The server may direct the third mobile device to obtain an image of fiducial markers presented on both of the first mobile device and the second mobile device. The first pose may be transmitted to the server from the first mobile device, the second pose may be transmitted to the server from the second mobile device, and the image may be transmitted to the server from the third mobile device. The server may then generate the coordinate-system transform using the first pose, the second pose, and the image, and transmit the coordinate-system transform to first mobile device and/or the second mobile device.

The blocks of FIG. 4, though presented in a particular order, may be executed in any particular order. In some instances, each block of FIG. 4 may be executed one or more times before moving on the next block. Although FIG. 4 describes mapping the coordinate systems associated with the two devices, the process of FIG. 4 may be extended to map the coordinate systems of any number of devices by, for example, having each additional device execute the processes of 404-432. For instances, the third mobile device may be directed to obtain an image of an additional mobile device presenting a fiducial image with the display of a fiducial image by the first mobile device, the second mobile device, or any other mobile device that has been previously mapped.

The process of FIG. 4 may be modified while still mapping the coordinate system of one device to the coordinate system of another device. For instance, the third device may receive an image of each device as a separate image such that a first image may include the display of the first mobile device and a second image may include the display of the second mobile device. The first mobile device, the second mobile device, and the third mobile device may be stationary between taking the first image and taking the second image. In another instance, the first fiducial marker may be a same fiducial marker as the second fiducial marker or a different fiducial marker. If different fiducial markers are used, the third device may include a feature point table that indicates common feature points (e.g., where the 2D coordinate locations are the same) in between fiducial markers. In some instances, the feature point table may be received from the first device and/or the second device along with the respective identifiers of the fiducial markers being displayed.

Figure 5:
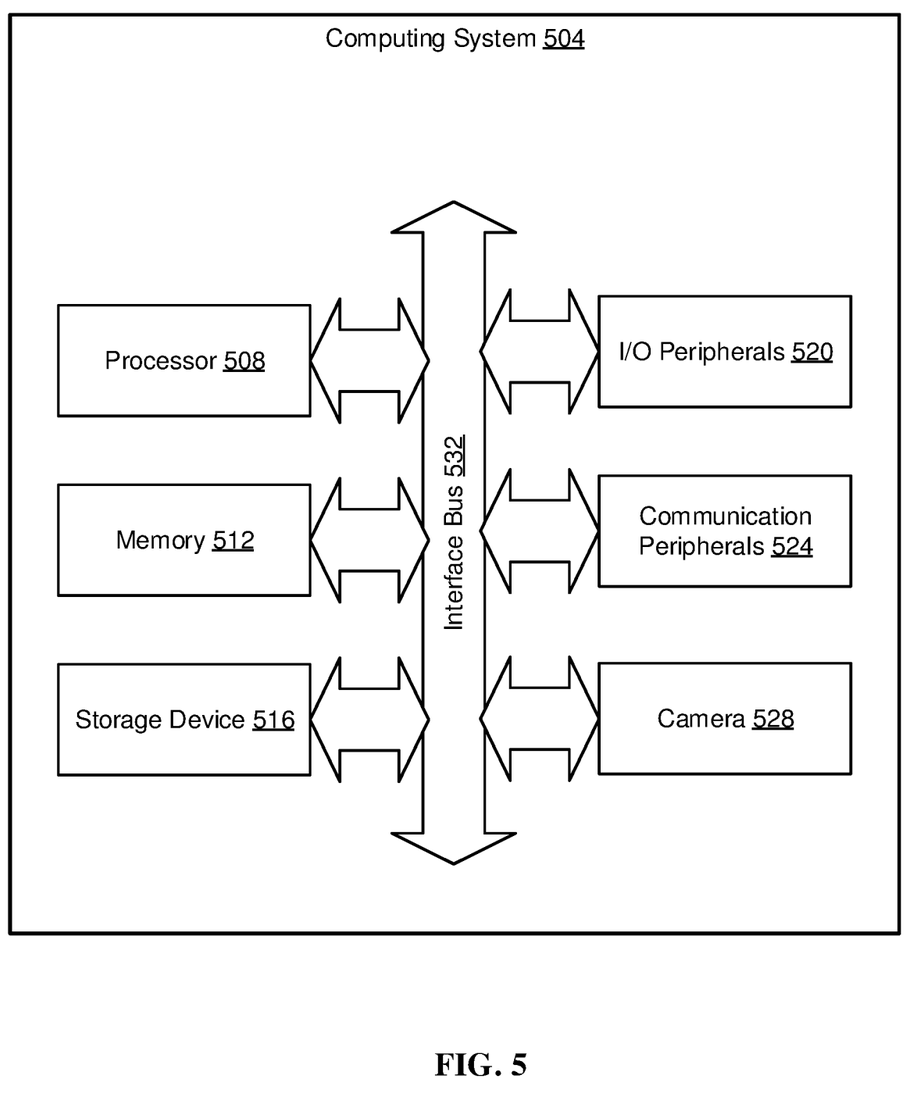

FIG. 5 illustrates examples of components of a computing system that executes an AR application according to at least one aspect of the disclosure. Computing system 504 can be an example of a mobile device described in connection FIG. 4. Although these components are illustrated as being part of computing system 504, computing system 504 can also be distributed such that some components may be positioned within a different hardware platform than other components.

Computing system 504 includes at least a processor 508, a memory 512, a storage device 516, input/output peripherals (I/O) 520, communication peripherals 524, one or more cameras 528, and an interface bus 532. Interface bus 532 can be configured to communicate, transmit, and transfer data, controls, and commands among the various components of computing system 504. Memory 512 and storage device 516 can include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. Memory 512 and storage device 516 may also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 504.

Further, memory 512 can includes an operating system, programs, and applications. Processor 508 may be configured to execute the stored instructions and includes, for example, a logical processing unit, a microprocessor, a digital signal processor, and other processors. Memory 512 and/or processor 508 can be virtualized and can be hosted within another computing system of, for example, a cloud network or a data center. I/O peripherals 520 can include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 520 are connected to processor 508 through any of the ports coupled to interface bus 532. Communication peripherals 524 may be configured to facilitate communication between computing system 504 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

While the principles of the disclosure have been described above in connection with specific apparatuses and methods, it is to be clearly understood that this description is made only by way of example and not as limitation on the scope of the disclosure.

What is claimed is:

1. A method comprising:
   receiving, by a third mobile device, data indicating a first pose of a first mobile device, wherein the first pose is defined relative to a first coordinate system associated with the first mobile device;
   receiving, by the third mobile device, data indicating a second pose of a second mobile device, wherein the second pose is defined relative to a second coordinate system associated with the second mobile device;
   receiving, by the third mobile device, an image that shows a first fiducial marker displayed by the first mobile device and a second fiducial marker displayed by the second mobile device;
   identifying, by the third mobile device at least based on the data indicating the first pose, a first set of three-dimensional coordinates associated with the first fiducial marker, the first set of three-dimensional coordinates being identified relative to the first coordinate system;
   identifying, by the third mobile device at least based on the data indicating the second pose, a second set of three-dimensional coordinates associated with the second fiducial marker, the second set of three-dimensional coordinates being identified relative to the second coordinate system;
   generating, by the third mobile device based on the first set of three-dimensional coordinates and the second set of three-dimensional coordinates, a coordinate-system transform that maps coordinates between the first coordinate system and the second coordinate system; and
   transmitting, by the third mobile device, the coordinate-system transform to the second mobile device.

2. The method of claim 1, wherein identifying the first set of three-dimensional coordinates includes:
   detecting a set of feature points of the first fiducial marker, wherein each three-dimensional coordinate of first set of three-dimensional coordinates corresponds to a feature point of the set of feature points.

3. The method of claim 2, wherein the set of feature points includes three or more feature points.

4. The method of claim 1, wherein the first pose is represented by a rotation vector and a translation vector, and wherein the first set of three-dimensional coordinates associated with the first fiducial marker are defined, at least in part, using the first pose and information about a geometry of the first mobile device.

5. The method of claim 1, wherein the coordinate-system transform is operable to cause a first virtual object to be presented by the first mobile device to appear in substantially a same position and substantially a same orientation within an environment as a second virtual object presented by the second mobile device.

6. The method of claim 1, wherein the coordinate-system transform comprises a matrix defining a mapping between the first coordinate system and the second coordinate system, and wherein transmitting the coordinate-system transform comprises transmitting the matrix to the second mobile device over a data network between the third mobile device and the second mobile device.

7. The method of claim 1, wherein objects within an environment within which the second mobile device is positioned are tracked based on the first coordinate system and the coordinate-system transform.

8. A mobile device comprising:
   one or more processors;
   a camera; and
   a non-transitory computer-readable medium storing instructions that, when executed by the one or more processors, cause the one or more processors to perform operations including:
      receiving data indicating a first pose of a first mobile device, wherein the first pose is defined relative to a first coordinate system associated with the first mobile device;
      receiving data indicating a second pose of a second mobile device, wherein the second pose is defined relative to a second coordinate system associated with the second mobile device;
      receiving an image that includes a portion of a first display of the first mobile device and a portion of a second display of the second mobile device, wherein the first display of the first mobile device includes a first fiducial marker and the second display of the second mobile device includes a second fiducial marker;
      identifying, at least based on the data indicating the first pose, a first set of three-dimensional coordinates associated with the first fiducial marker, the first set of three-dimensional coordinates being relative to the first coordinate system;
      identifying, at least based on the data indicating the second pose, a second set of three-dimensional coordinates associated with the second fiducial marker, the second set of three-dimensional coordinates being relative to the second coordinate system;
      generating a coordinate-system transform using the first set of three-dimensional coordinates and the second set of three-dimensional coordinates, wherein the coordinate-system transform maps coordinates between the first coordinate system and the second coordinate system; and transmitting coordinate-system transform to the second mobile device.

9. The mobile device of claim 8, wherein identifying the first set of three-dimensional coordinates includes:

detecting a set of feature points of the first fiducial marker, wherein each three-dimensional coordinate of first set of three-dimensional coordinates corresponds to a feature point of the set of feature points.

10. The mobile device of claim 9, wherein the set of feature points includes three or more feature points.

11. The mobile device of claim 8, wherein the first pose is represented by a rotation vector and a translation vector, and wherein the first set of three-dimensional coordinates associated with the first fiducial marker are defined, at least in part, using the first pose and information about a geometry of the first mobile device.

12. The mobile device of claim 8, wherein the coordinate-system transform is operable to cause a first virtual object to be presented by the first mobile device to appear in substantially a same position and substantially a same orientation within an environment as a second virtual object presented by the second mobile device.

13. The mobile device of claim 8, wherein the coordinate-system transform comprises a matrix defining a mapping between the first coordinate system and the second coordinate system, and wherein transmitting the coordinate-system transform comprises transmitting the matrix to the second mobile device over a data network.

14. The mobile device of claim 8, wherein objects within an environment within which the second mobile device is positioned are tracked based on the first coordinate system and the coordinate-system transform.

15. A non-transitory computer-readable medium storing instructions that, when executed by one or more processors, cause the one or more processors to perform operations including:

receiving data indicating a first pose of a first mobile device, wherein the first pose is defined relative to a first coordinate system associated with the first mobile device;

receiving data indicating a second pose of a second mobile device, wherein the second pose is defined relative to a second coordinate system associated with the second mobile device;

receiving an image that includes a portion of a first display of the first mobile device and a portion of a second display of the second mobile device, wherein the first display of the first mobile device includes a first fiducial marker and the second display of the second mobile device includes a second fiducial marker;

identifying, at least based on the data indicating the first pose, a first set of three-dimensional coordinates associated with the first fiducial marker, the first set of three-dimensional coordinates being relative to the first coordinate system;

identifying, at least based on the data indicating the second pose, a second set of three-dimensional coordinates associated with the second fiducial marker, the second set of three-dimensional coordinates being relative to the second coordinate system;

generating a coordinate-system transform using the first set of three-dimensional coordinates and the second set of three-dimensional coordinates, wherein the coordinate-system transform maps coordinates between the first coordinate system and the second coordinate system; and transmitting coordinate-system transform to the second mobile device.

16. The non-transitory computer-readable medium of claim 15, wherein identifying the first set of three-dimensional coordinates includes:

detecting a set of feature points of the first fiducial marker, wherein each three-dimensional coordinate of first set of three-dimensional coordinates corresponds to a feature point of the set of feature points.

17. The non-transitory computer-readable medium of claim 16, wherein the set of feature points includes three or more feature points.

18. The non-transitory computer-readable medium of claim 15, wherein the first pose is represented by a rotation vector and a translation vector, and wherein the first set of three-dimensional coordinates associated with the first fiducial marker are defined, at least in part, using the first pose and information about a geometry of the first mobile device.

19. The non-transitory computer-readable medium of claim 15, wherein the coordinate-system transform is operable to cause a first virtual object to be presented by the first mobile device to appear in substantially a same position and substantially a same orientation within an environment as a second virtual object presented by the second mobile device.

20. The non-transitory computer-readable medium of claim 15, wherein objects within an environment within which the second mobile device is positioned are tracked based on the first coordinate system and the coordinate-system transform.

* * * * *